United States Patent

Glucksman et al.

[11] Patent Number: 5,835,680
[45] Date of Patent: Nov. 10, 1998

[54] IMMERSION HEATER AND SUPPORT STRUCTURE

[75] Inventors: Dov Glucksman, Wenham; Karl H. Weidemann, Hull, both of Mass.

[73] Assignee: Appliance Development Corp., Danvers, Mass.

[21] Appl. No.: 726,636

[22] Filed: Oct. 7, 1996

[51] Int. Cl.⁶ ..................................................... F24H 9/12
[52] U.S. Cl. ........................... 392/501; 392/503; 338/315; 338/317; 219/338
[58] Field of Search ..................................... 392/500, 501, 392/503; 338/315, 316, 317; 219/436, 438

[56] References Cited

U.S. PATENT DOCUMENTS

| | | | |
|---|---|---|---|
| 3,283,940 | 11/1966 | Coates | 392/501 |
| 4,238,666 | 12/1980 | Pomper | 392/501 |
| 4,263,470 | 4/1981 | Sjoberg | 338/317 |
| 5,159,659 | 10/1992 | Cameron | 392/501 |
| 5,404,803 | 4/1995 | Glucksman | 99/473 |

FOREIGN PATENT DOCUMENTS

| | | | |
|---|---|---|---|
| 2951014 | 7/1980 | Germany | 392/500 |
| 620384 | 3/1947 | United Kingdom | 392/500 |

*Primary Examiner*—Teresa J. Walberg
*Assistant Examiner*—Qwan Nguyen
*Attorney, Agent, or Firm*—Sofer & Haroun, LLP

[57] ABSTRACT

An apparatus for heating water is provided having a water receptacle including a bottom wall and side walls for containing a volume of water therein to be heated. The bottom wall of the receptacle has an exterior surface and an interior surface proximate the volume of water to be heated. The water is heated by a heater contained within the water receptacle and secured to the interior surface of the bottom wall of the receptacle by a securement pin which extends through the bottom wall and is threadably engaged with the heater. The heater is elevated from the interior surface of the water receptacle by a collar of high insulation material which is received within a peripheral groove portion of the heater such that the tightening of the securement pin compresses the rubber collar to create a seal between the heater and the bottom wall of the water receptacle. In addition, the elevating collar serves as a barrier between the heater and the bottom wall such that the heater is not in direct contact with the water receptacle wherein in the event of overheating, the heater does not melt or burn the water receptacle.

17 Claims, 5 Drawing Sheets

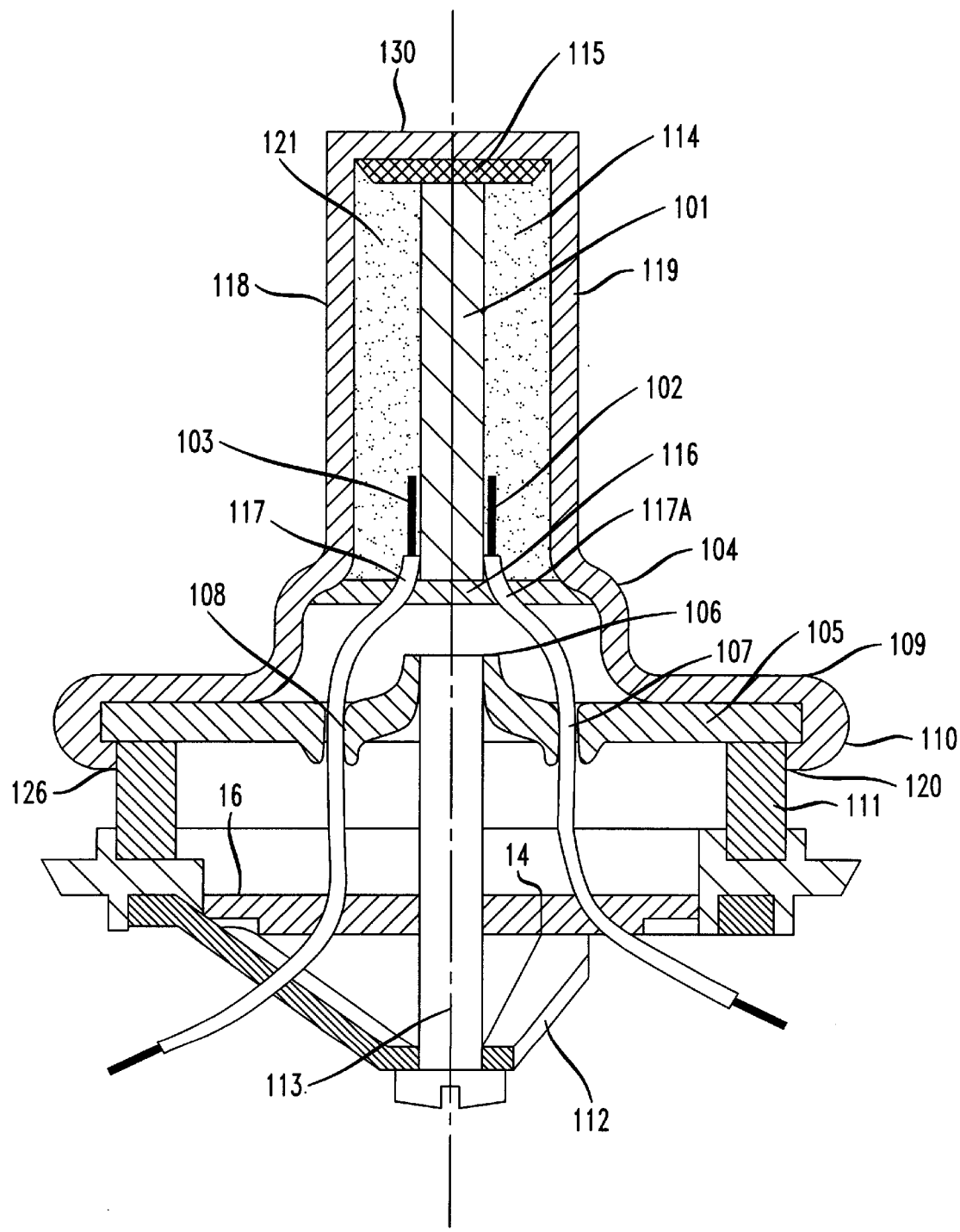

5,835,680

IMMERSION HEATER AND SUPPORT STRUCTURE

FIELD OF THE INVENTION

This invention relates to an immersion heater and support structure, and in particular, to an appliance that utilizes an electric water heater that is immersed in a water receptacle containing a volume of water, the appliance including a support structure that distances the heater away from an interior wall of the water receptacle, provides for a support structure that secures the heater to an exterior surface of the water receptacle, and creates a fluid tight seal preventing any leakage of fluid out of the water receptacle.

BACKGROUND OF THE INVENTION

Heated water or steam is universally required for appliances that are used in the preparation and cooking of food, humidifying of a room or distilling of raw water. When used in these type of appliances, steam is generally generated by heating water above its boiling point whereupon it undergoes a phase change from liquid into steam. When utilizing a food steamer, the steam provides a very efficient and natural way in which to heat and/or cook food. When utilizing a humidifier for humidifying a volume of air, a steam mixture is also generated by heating water above its boiling point wherein the water changes into steam. The steam is expelled from the appliance in order to increase the rate of humidity of the volume of air in the desired space. When distilling raw water, steam first must be generated thus allowing the contaminants in the raw water, which are generally heavier, to remain within the raw water. The steam is then condensed by a series of condenser coils in order to produce distilled water.

In all of these types of appliances and in order to create the steam, it is necessary to heat water contained within a water receptacle. However, due to the relatively high temperature that is required to vaporize water and produce steam, inexpensive plastic materials such as polypropylene plastic cannot be used within the water receptacle, requiring that the water receptacle be fabricated out of more expensive plastic materials such as polyphenylene sulfid (P.P.S.), polybutylene terephthalate (P.B.T.) or polycarbonate resins which are capable of withstanding higher temperatures. In other instances, certain portions of the water receptacle must be fabricated out of these expensive high temperature plastic materials which have to be attached to the lower cost materials that the rest of the appliance is made of which leads both to increased cost of materials and to increased manufacturing costs as additional parts must be inserted proximate the heater in the water receptacle.

For example, U.S. Pat. No. 5,404,803 to Glucksman provides for a food steamer utensil which comprises an interconnected yet separable and self-contained steam generator and food cooking vessel. The steam is formed in the steam generator vessel by a heater immersed in water and the steam is conducted into the food cooking vessel in the form of a jet stream. The steam then disperses itself along the horizontal cross sectional area of the vessel where it contacts the food to cook the food therein. The heater and related electrical components for heating the water are disposed in the steam generator vessel. The heater is generally positioned upon a horizontal surface in the lower portion of the steam generator vessel and mounted directly to the surface with screws or other attachment means. In order to create steam, water is poured into the steam generator vessel completely immersing the heater therein. As the heater is energized, the water boils and is converted to steam and passes into the food cooking vessel. Generally, a small amount of water remains in the steam generator vessel to cool the heater and prevent overheating. After the food is cooked and most of the water is depleted, the heater shuts off by way of a thermostat mechanism.

However, in instances when the heater fails to shut off, heat continues to be generated. Since the main housing of the food steamer utensil is made from polypropylene plastic, this creates a dangerous situation which may lead to a fire or damage to the steamer which may melt. To alleviate this possibility of fire or meltdown of the steamer, the surface upon which the heater is mounted is generally comprised of a high temperature plastic material such as P.P.S., P.B.T. or polycarbonate resins. Use of polycarbonate, P.P.S. or P.B.T. plastic is unfavorable, however, because of its higher cost as compared to polypropylene plastic as well as the increased manufacturing costs of inserting such high insulating plastic material in and around the heater. Accordingly, there is a need for an apparatus for heating water which effectively heats water to create steam, and which is safe to use and inexpensive to manufacture.

OBJECTS AND SUMMARY OF THE INVENTION

It is thus a general object of the present invention to provide an apparatus for heating water within which a heater and support structure may be completely immersed in the water, and which is effective in heating water to create steam for use in any type of appliance that requires heated water. Such appliances may include but are not limited to food steamers, distillers, vaporizers or humidifiers.

A more specific object of the present invention is to provide an apparatus for heating water within which a heater may be mounted upon a surface in a water receptacle for containing water, wherein the surface upon which the heater is mounted is not prone to overheating.

It is another object of the present invention to provide an apparatus for heating water within which a heater is mounted upon a surface in a receptacle containing water and in which the heater is fully immersed in the water and wherein the heater is distanced from the surface it is mounted upon by a silicon rubber collar member such that the distancing of the heater from the surface alleviates the danger of meltdown of the surface if the heater overheats.

Another object of the present invention is to allow the water receptacle to be fabricated out of an inexpensive polypropylene material rather than expensive P.P.S., P.B.T., or polycarbonate resins, as the immersion heater is elevated and spaced apart from the polypropylene water receptacle by the silicon rubber collar member.

A further object of the invention is to provide a securement pin which extends through a hole in the water receptacle, compressing the collar member in order to form a seal to prevent the leakage of water through the hole of the water receptacle.

An additional object of the invention is to provide a water reservoir, the height of the collar member which does not come into contact with the elevated immersion heat. When the water in contact with the heater is evaporated, the water reservoir provides a high temperature water barrier within the water receptacle between the heater and the bottom wall of the water receptacle which is fabricated out of inexpensive polypropylene plastic material.

In accordance with one aspect of the present invention, an apparatus for heating water is provided wherein the apparatus comprises a water receptacle having a bottom wall and side walls for containing a volume of water to be heated therein. The bottom wall of the water receptacle has an exterior surface and an interior surface, the interior surface proximate the volume of water to be heated. An electric heater encased in an aluminum die cast cartridge is positioned on the interior surface of the bottom wall of the water receptacle. The heater is elevated from the interior surface by a distancing means which comprises a collar member, and wherein the heater and the distancing means are secured to the bottom wall of the water receptacle.

The heater of the present invention is provided with a peripheral grooved portion wherein the collar member for elevating the heater from the interior surface is positioned in the grooved portion such that a seal is formed between the heater and the bottom wall of the water receptacle. The heater is secured to the bottom wall of the water receptacle by a securement pin extending through an opening in the bottom wall and also includes a spoked cone washer adjacent the exterior surface of the water receptacle such that the washer retains the securement pin to the water receptacle so that the rubber collar is compresses when the securement pin is tightened. By using the rubber collar, a thermal barrier is placed between the heater and the bottom wall of the water receptacle such that the heater is not in contact with the bottom wall of the water receptacle. As such, the danger of a fire or the melting of the plastic water receptacle is eliminated as is the requirement that expensive high insulating plastic be utilized to alleviate the possibility of a fire or the meltdown of the water receptacle in the event the heater overheats.

Alternatively, the heater positioned within the water receptacle may comprise a PTC stone heating element disposed within an outer heater enclosure shell. The PTC stone heating element includes two leads for conduction of electricity to the PTC stone heating element. PTC heaters are semi-conductors having conductivity inversely proportional to their overall temperature. Thus, while the heater is cold, its conductivity is high, and high current will flow through it thereby generating a great amount of thermal energy. On the other hand, if the heater is rising in temperature, such as would be the case when the water surrounding the heater has been depleted, the conductivity of the PTC element would drop dramatically resulting in the generation of only a small amount of heat by the heater. As a result, since the PTC heater is capable of maintaining its own temperature, the PTC heater does not require protection by thermostats or thermofuses.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views:

FIG. 6 illustrates a cross-section of the heater illustrated in FIG. 5 with its details more clearly illustrated.

DETAILED DESCRIPTION OF THE PRESENTLY PREFERRED EMBODIMENT

Figure 1:
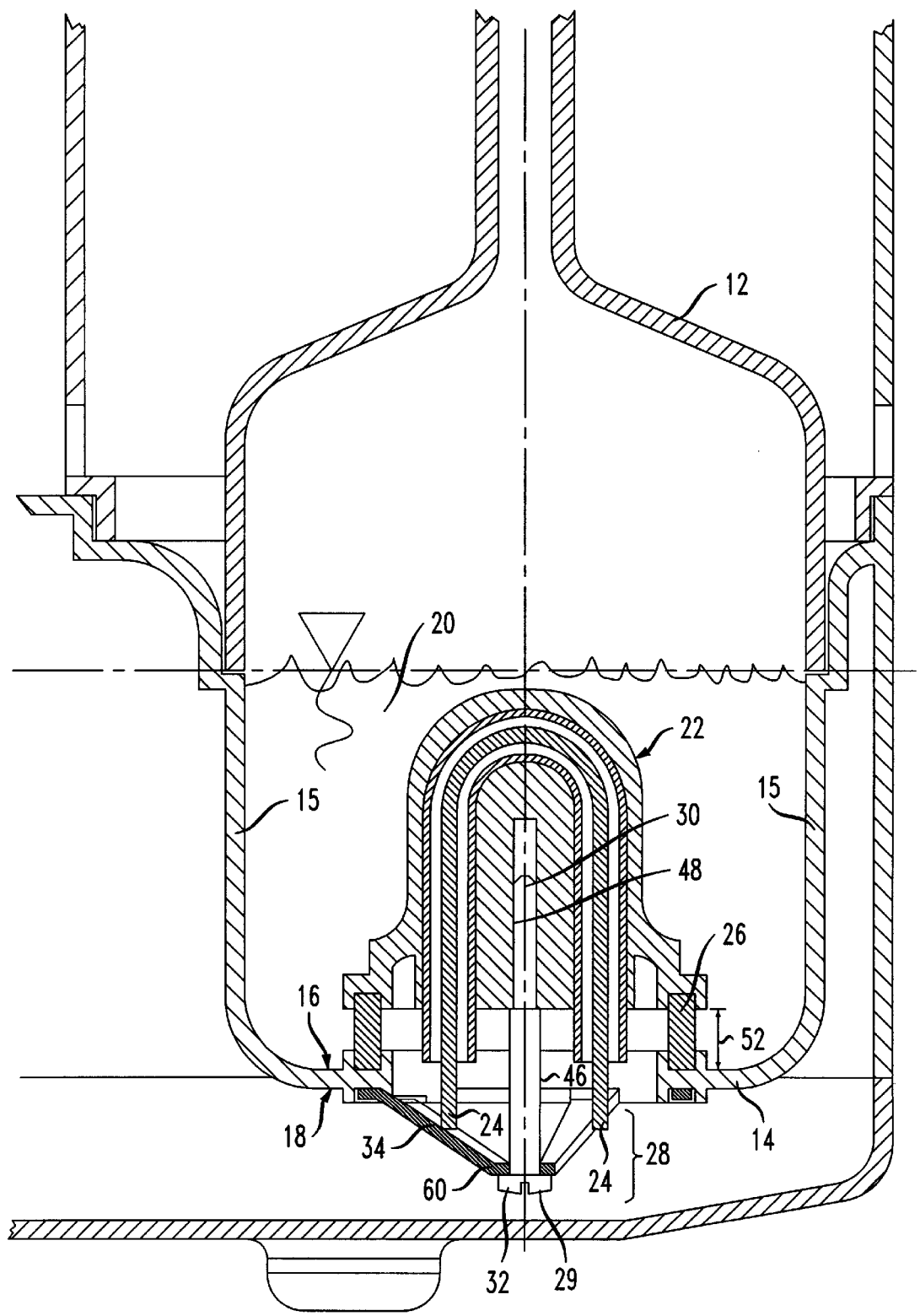
FIG. 1 illustrates the preferred embodiment of the apparatus for heating water according to the present invention wherein a heater is secured within a water receptacle contained within the appliance housing.

Referring now to the drawings, and more particularly to FIG. 1 hereof, the apparatus for heating water of the present invention is generally designated by the reference character 10 and comprises water receptacle 12, means for heating said volume of water such as an electric heater 22, distancing means 26, and securement means 28. Heater 22 is shown in FIG. 1 in a secured and operable position when the apparatus 10 is to be operably used to perform its function of steaming and heating. Water receptacle 12, which may be of any shape or configuration, is provided with a bottom wall 14 and side walls 15 for retaining a volume of water 20 within its confines. Bottom wall 14 has an interior surface 16 proximate water 20 and an exterior surface 18.

Figure 2:
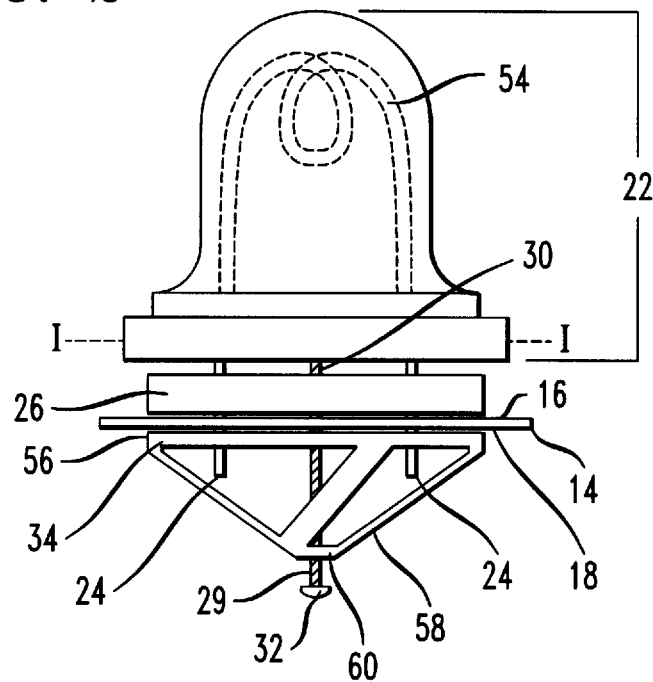
FIG. 2 illustrates an exploded front elevation view partially in cross-section of the heater and connecting support structure shown in FIG. 1.
Figure 3:
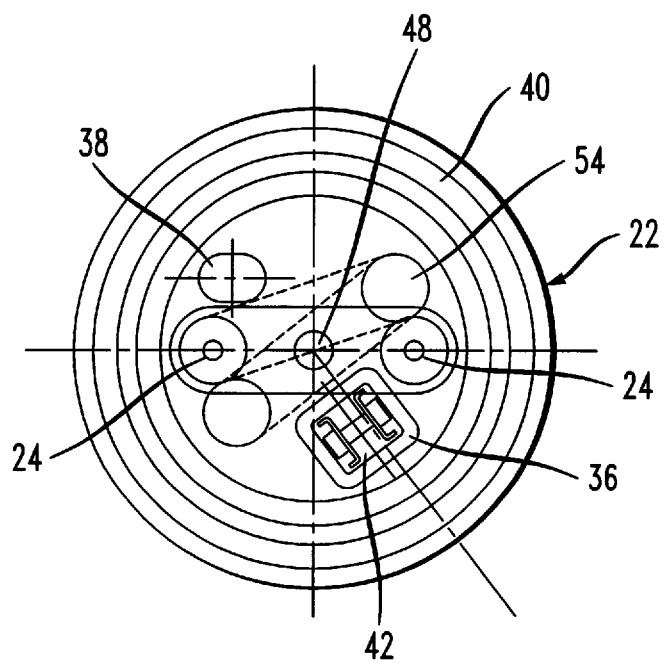
FIG. 3 illustrates a bottom plan view of the heater as shown in FIG. 1.

As illustrated in FIG. 2, heater 22, comprises an electric heating element encased in an aluminum die cast cartridge, and is fully immersed in water 20 for heating the volume of water 20 within water receptacle 12. It should be noted that any type appliance that is suitable for use with an electric heater such as a distiller, humidifier or food steamer may be utilized although, the invention is not limited in this respect. As shown in FIG. 3, heater 22 is further provided with a peripheral grooved portion 40 which is configured to receive distancing means 26 which distances heater 22 out of direct contact with interior surface 16 of bottom wall 14 within water receptacle 12. Distancing means 26 is advantageously a circular collar member of high temperature rubber, such as for example silicon rubber. It should be noted however that the invention is not limited in this respect and other high temperature materials may be utilized as well. Typically, the width of the distancing means 26, and thus the degree of distancing off and away from interior surface 16 of the bottom wall 14 is in the range of about ⅜ to ½ of an inch, although any suitable width may be utilized to achieve the purpose of distancing the heater 22 from bottom wall 14. As is evident, the width of collar member 26 depends on the type and temperature intensity of the heater used. In view of the elevation of heater 22 relative to bottom wall 14, bottom wall 14 may be fabricated out of polypropylene plastic instead of more expensive P.P.S., P.B.T. or polycarbonate resins. Also as shown in FIG. 1, a water reservoir, as denoted by element 52, is provided which is substantially equal to the height of collar member 26. When water 20 no longer surrounds heater 22 such as when water 20 is evaporated, water reservoir 52 provides a high temperature water barrier the width of the collar member 26 between heater 22 and bottom wall 14. In this way, bottom wall 14 may be fabricated out of an inexpensive polypropylene plastic material. Thus, the water reservoir 52 prevents meltdown of bottom wall 14 of the water receptacle 12.

Figure 4:
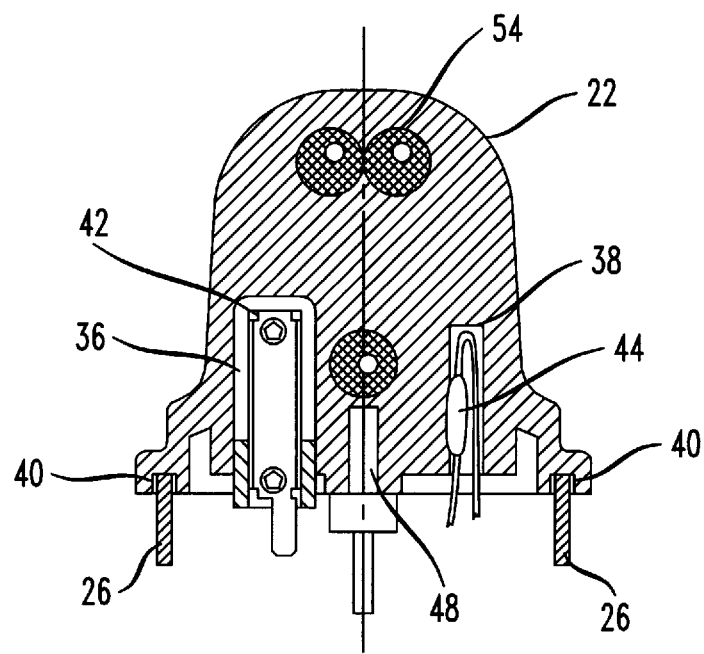
FIG. 4 illustrates a cross-sectional view of the heater as shown in FIG. 3.

With continued reference to FIGS. 2, 3 and 4 when collar member 26 is received in peripheral grooved portion 40 of heater 22 and placed upon interior surface 16 of bottom wall 14, a securement pin 29 is inserted through an opening 46 in bottom wall 14 and into an engagement surface 48 contained within heater 22. In this way, securement pin 29 securely retains heater 22, collar member 26 to interior surface 16 of bottom wall 14. Securement pin 29 which may be a screw or any other form of attachment means, has a first end 30 and a second end 32 wherein first end 30 passes through opening 46 in bottom wall 14, preferably for threadable engagement with engagement surface 48 of heater 22. A washer or spoked cone 34 may be placed between exterior surface 18 of bottom wall 14 and the head of securement pin 29 so that when securement pin 29 is inserted through opening 46 of bottom wall 14 and when first end 30 of securement pin 29 is engaged with engagement surface 48 of heater 22, second end 32 of securement pin 29 contacts spoked cone 34 and retains spoked cone 34 in place against exterior surface 18 of bottom wall 14. In this way, when securement pin 29 is tightened, collar member 26 is tightly fixed against interior surface 16 of bottom wall 14 to create a fluid tight seal between the volume of water 20 contained within water receptacle 12 and exterior surface 18 of bottom wall 14 of water receptacle 12. As shown in FIG. 2, spoked cone 34 may advantageously be configured as an outer support ring 56 having a diameter substantially the same as the diameter of collar member 26, the spoked cone having spoked members 58 which extend downwardly at an angle of approximately 45 degrees towards the center of a central hub 60. Hub 60 includes an opening having a diameter that is slightly larger than the diameter of securement pin 29.

As shown in FIGS. 3 and 4, heater 22 is provided with a first opening 36 for receiving a thermostat 42. Thermostat 42 is connected to heater 22 so that a heating element 54, as shown in FIG. 2, which is connected to electrical contacts 24 may be disengaged when a predetermined temperature is reached in order to avoid overheating such as when the water 20 in the water receptacle 12 is almost fully evaporated. Heater 22 is also provided with a second opening 38 to accommodate a thermofuse 44. Thermofuse 44 provides a second safety feature which backs up thermostat 42 in order to shut off heater 22 before water 20 is totally evaporated from the water receptacle 12 in the event the thermostat 42 malfunctions.

Figure 5:
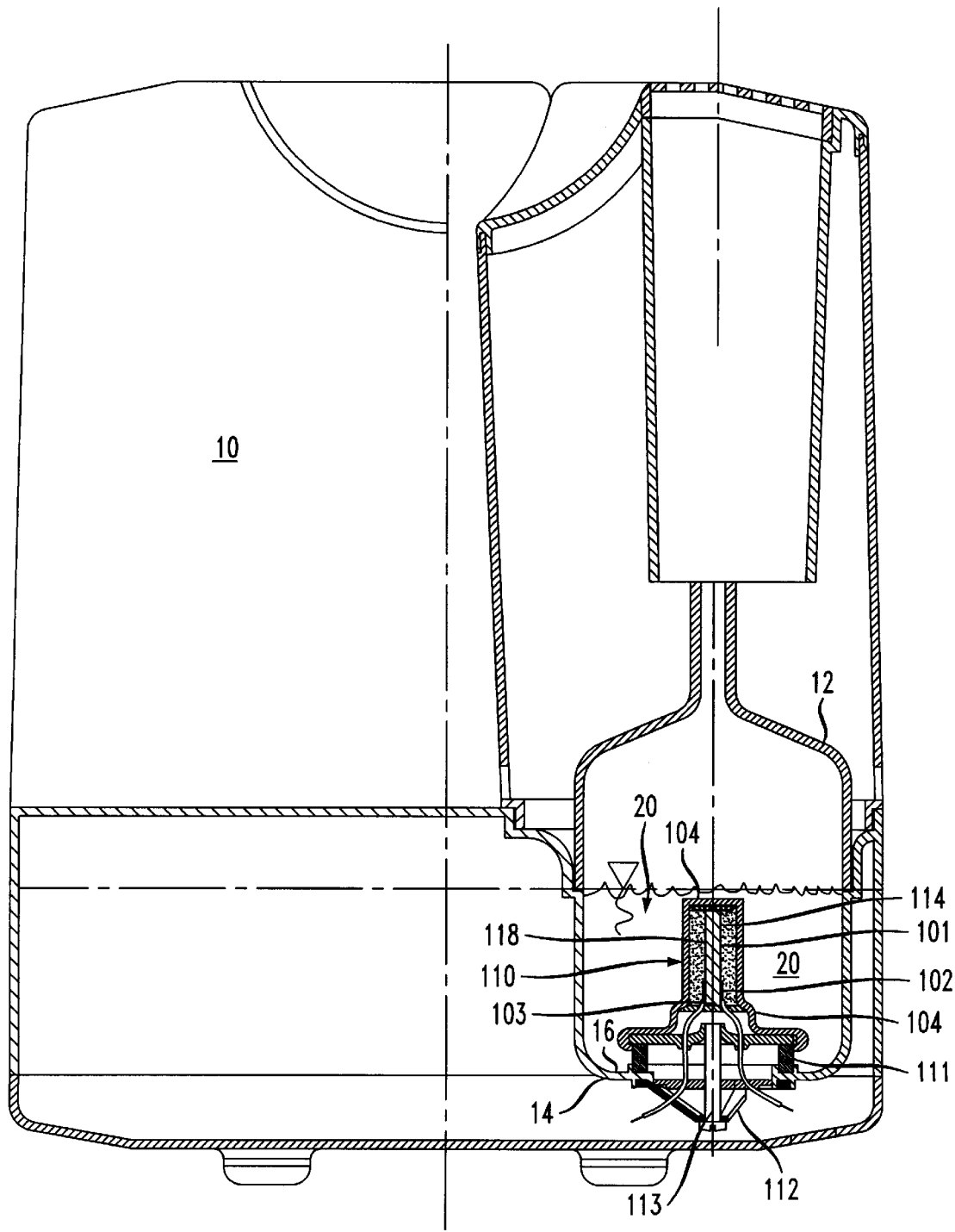
FIG. 5 illustrates another embodiment of the apparatus for heating water according to the present invention wherein the heater is secured within the appliance housing.

FIGS. 5 and 6 illustrate an alternative embodiment of the electric heater according to the present invention. On this embodiment, heater 100 includes an outer aluminum cylindrical enclosure 104, which encloses a PTC stone heating element 101, the PTC stone heating element 101 having opposing faces 118, 119, each face having a wire lead 102, 103 welded thereto for conduction of electricity to faces 118, 119. Heater 100, shown in greater detail in FIG. 6, further comprises a cap plate 105, preferably a flat piece of aluminum. Cap plate 105 has a threaded opening 106 in its center area, and has openings 107, 108 to each side of threaded opening 106, to permit wire leads 102, 103 to pass out from heater enclosure 104. Heater enclosure 104 is provided with flange portion 109 which overlaps the perimeter of cap plate 105 and is rolled over cap plate 105 to tightly hold cap plate 105 to heater 100. Flange 109 includes a rolled over portion 110 at its extreme which creates a peripheral grooved portion 120 about the cap plate 105. Collar member 111 for distancing heater 100 from interior surface 16 of bottom wall 14 of water receptacle 12 and which holds heater 100 in spaced alignment with interior surface 16 of bottom wall 14 of water receptacle 12 is disposed between interior surface 16 of bottom wall 14 of water receptacle 12 and cap plate 105 where it is received in grooved portion 120. Collar member 112, preferably a spoked cone, retains heater 100 to bottom wall 14 of water receptacle 12, by a screw 113 which passes through bottom wall 14 of water receptacle 12 and is received in threaded opening 106 in cap plate 105. Tightening screw 113 compresses collar member 111 to create a water-tight seal between heater flange 109 and interior surface 16 of bottom wall of receptacle 12.

To rapidly transfer heat from the PTC element, an electrically insulating but thermally conductive material 114, such as, for example, high temperature silicon rubber paste, is filled into void 121 between PTC stone and heater enclosure shell 104. Material 114 may be further loaded with a thermally conductive mass such as magnesium oxide grains which help transfer the heat from heater 101 to heater enclosure shell 104 and the surrounding water 20 (shown in FIG. 5). To prevent electric contact between heating element 101 and the top 130 of heater enclosure shell 104, a first mica disk 115 is disposed therebetween. A second mica disk 116 having perforations 117, 117A, through which wire leads 102, 103 may be threaded, is provided for centering heating element 101 within heater enclosure to prevent the electrically live heating element 101 from contacting any metal parts.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. An apparatus for heating water, said apparatus comprising:

a water receptacle having a bottom wall and side walls for containing a volume of water to be heated, said bottom wall having an exterior surface, an interior surface, and an opening in said bottom wall communicating between said exterior and interior surface, said interior surface proximate said volume of water to be heated;

means for heating said volume of water contained within said water receptacle;

means for distancing said means for heating said volume of water away from said interior surface of said water receptacle; and means for securing said heater to said exterior surface of said water receptacle so that said heater is coupled to said distancing means and to said bottom wall of said receptacle.

2. The apparatus for heating water as set forth in claim 1, wherein said means for heating said volume of water is provided with a peripheral grooved portion and wherein said means for distancing said heater means away from said interior surface comprises a collar member, said collar member positioned within said grooved portion for forming a seal between said volume of water, said heating means, and said opening in said bottom wall.

3. The apparatus of claim 2, wherein said collar member is fabricated from a silicon rubber material.

4. The apparatus of claim 3, wherein said collar member is provided with a width in the range of about ⅜ to about ½ of an inch.

5. The apparatus of claim 3, wherein said bottom wall of said water receptacle is fabricated from a molded polypropylene resin.

6. The apparatus of claim 1, further comprising:

a securement pin extending through an opening in said bottom wall of said water receptacle, said securement pin having first and second ends, wherein said first end of said securement pin is matingly engaged with said heater means; and a washer adjacent said exterior surface of said water receptacle, wherein said washer retains said second end of said securement pin to said exterior surface of said bottom wall of said water receptacle so that when said securement pin is tightened, said collar member is compressed relative to said bottom wall of said water receptacle to form a liquid tight seal for containing said volume of water in said water receptacle.

7. The apparatus of claim 6, wherein said first end of said securement pin is provided with threads for threaded engagement with said means for heating said volume of water.

8. The apparatus of claim 1, wherein said means for heating said volume of water is an electric heater encased in an aluminum die cast cartridge.

9. The apparatus of claim 2, wherein said means for heating said volume of water further comprises an electric heating element having a heater enclosure shell, a heating element disposed within said heater enclosure shell and wire leads connected to said electric heating element for generating heat to be conducted to said heater enclosure shell.

10. The apparatus of claim 9, wherein said heater enclosure shell is provided with a bottom cap secured to said heater enclosure shell, said cap positioned proximate said interior surface of said bottom wall, said cap having a threaded center portion.

11. The apparatus of claim 10, wherein said heater enclosure shell further comprises a flange portion, said flange portion overlapping said cap.

12. The apparatus of claim 9, wherein the interior of said heater enclosure shell is filled with an electrically insulating thermally conductive material for facilitating transfer of heat from said electric heating element to said heater enclosure shell.

13. The apparatus of claim 1, wherein said means for heating said volume of water is provided with a first opening for receiving a thermostat for shutting off said means for heating when said thermostat reached a predetermined temperature.

14. The apparatus of claim 1 wherein said means for heating said volume of water is provided with a second opening for receiving a thermofuse.

15. An apparatus for heating water, said apparatus comprising:

a water receptacle having a bottom wall and side walls for containing a volume of water to be heated, said bottom wall having an exterior surface, an interior surface, and an opening in said bottom wall communicating between said exterior and interior surface, said interior surface proximate said volume of water to be heated;

an electric heater for heating said volume of water contained within said water receptacle;

a collar member for spacing said electric heater in said volume of water away from said interior surface of said water receptacle;

a securement pin extending through said opening in said bottom wall of said water receptacle, said securement pin having first and second ends, wherein said first end of said securement pin is matingly engaged with said electric heater; and a washer adjacent said exterior surface of said water receptacle, wherein said washer retains said second end of said securement pin to said exterior surface of said water receptacle so that when said securement pin is tightened, said collar member is compressed relative to said interior surface of said water receptacle to form a liquid tight seal between said water receptacle and said exterior surface of said water receptacle.

16. The apparatus of claim 15, wherein said collar member is fabricated from a silicon rubber material.

17. The apparatus of claim 15, wherein said bottom wall of said water receptacle is fabricated from a polypropylene resin.

* * * * *